March 25, 1924.  
J. R. SEMPLE  
1,488,172  
MACHINE FOR FORMING AND INSERTING BUSHINGS IN PIANO ACTIONS  
Filed Jan. 26, 1920  
7 Sheets-Sheet 3

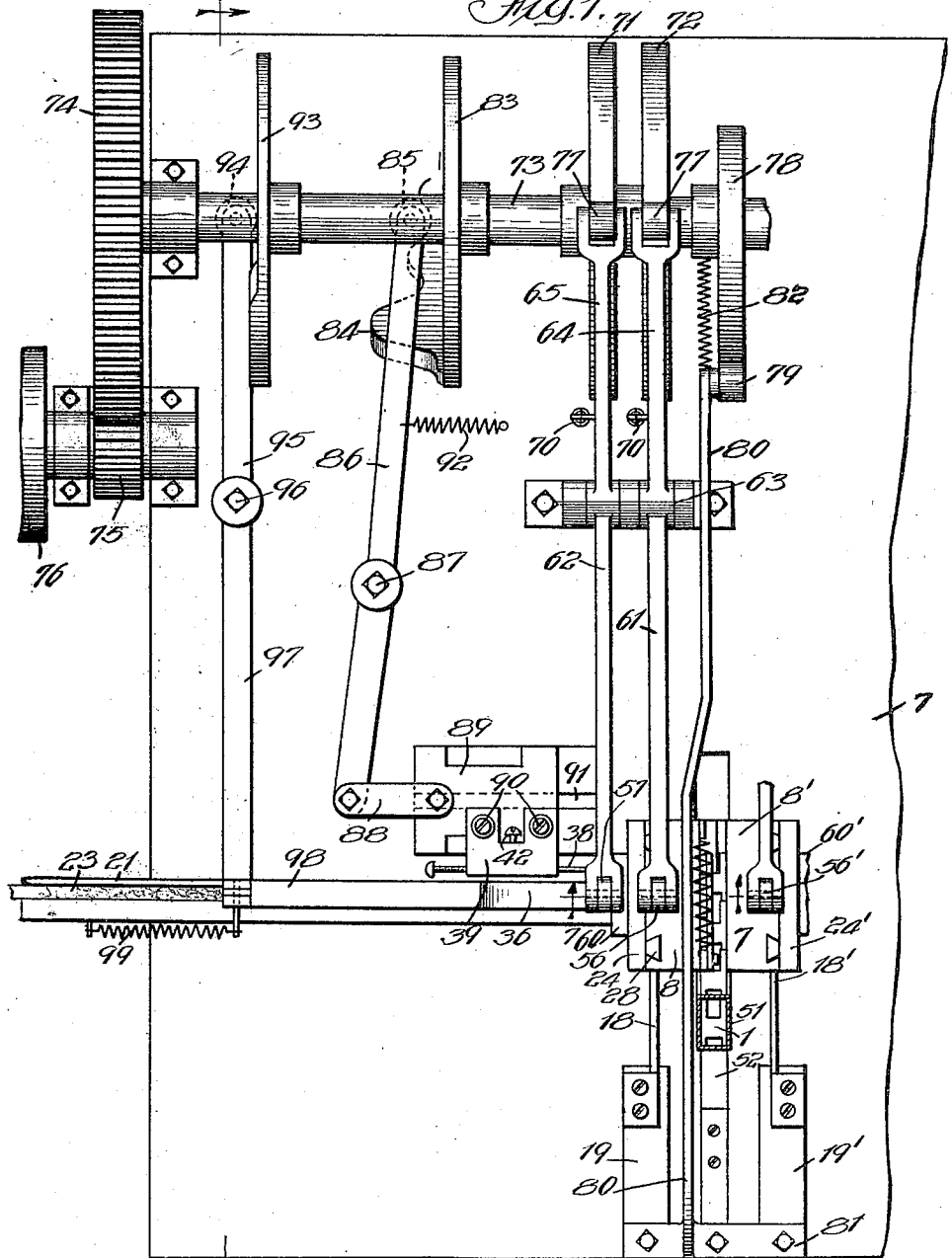

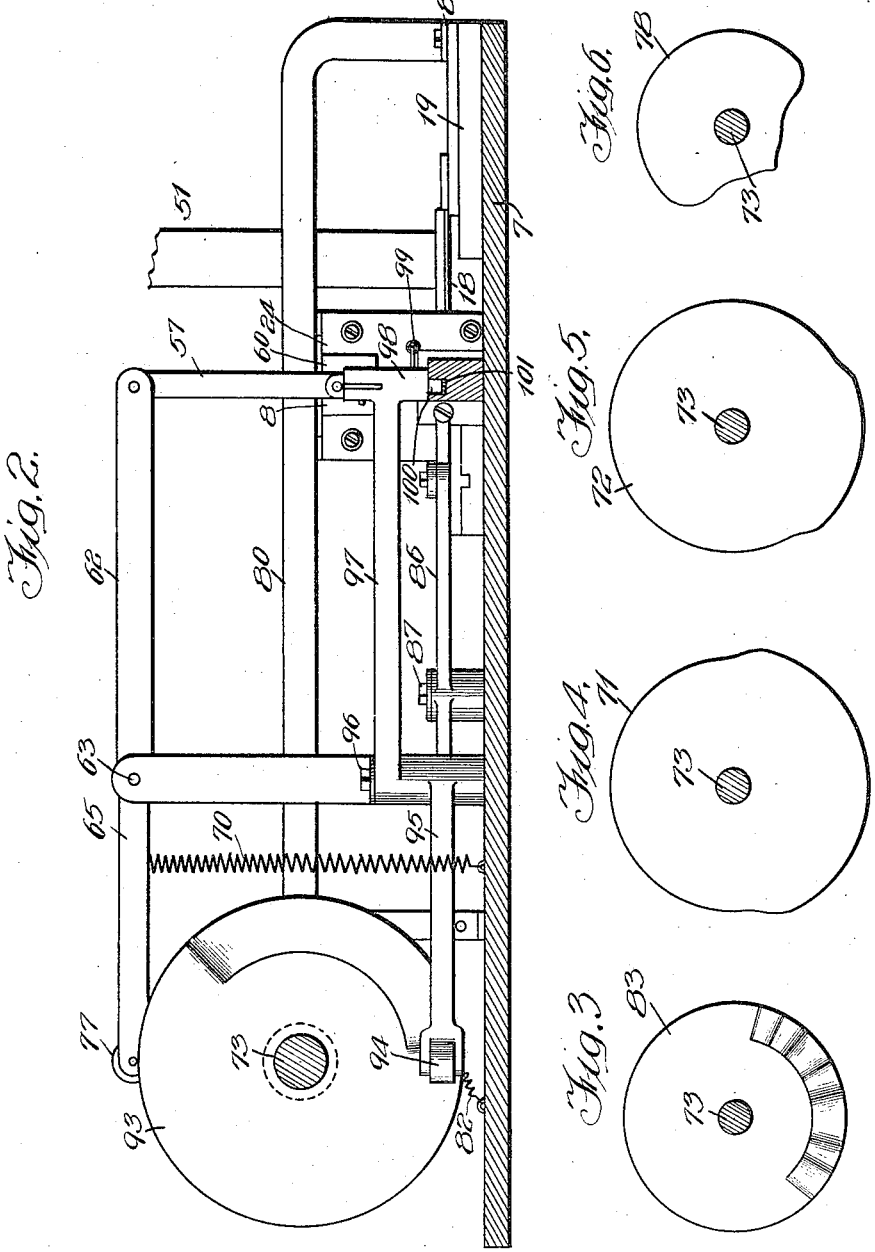

Witnesses:  
W. F. Kilroy  
Harry R. L. White

Inventor:  
James R. Semple  
By Hiie & Hiie  
Att'ys.

March 25, 1924.
J. R. SEMPLE
1,488,172
MACHINE FOR FORMING AND INSERTING BUSHINGS IN PIANO ACTIONS
Filed Jan. 26, 1920
7 Sheets-Sheet 4
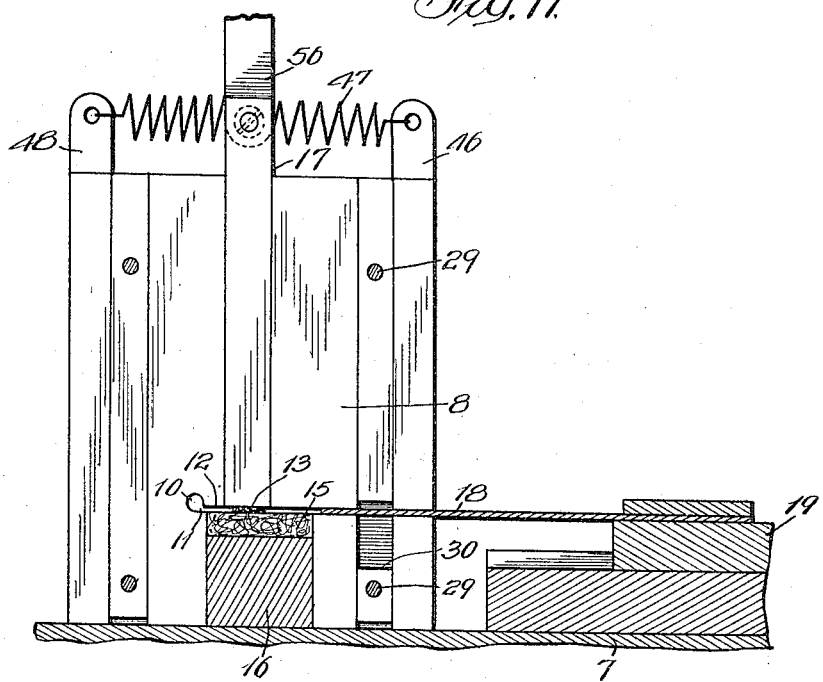
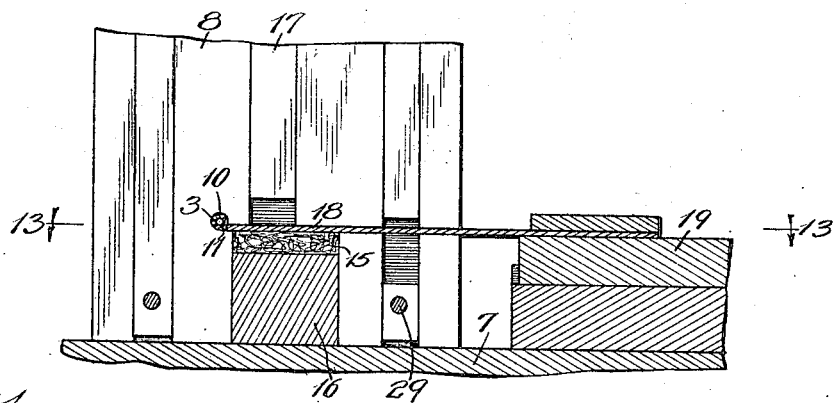

March 25, 1924.

J. R. SEMPLE 1,488,172

MACHINE FOR FORMING AND INSERTING BUSHINGS IN PIANO ACTIONS

Filed Jan. 26, 1920

Witnesses:
W. P. Kilroy
Harry R. L. White

Inventor:
James R. Semple
By Hill & Hill
Attys.

March 25, 1924.

J. R. SEMPLE 1,488,172

MACHINE FOR FORMING AND INSERTING BUSHINGS IN PIANO ACTIONS

Filed Jan. 26, 1920

Witnesses
W. F. Kilroy
Harry R. L. White

Inventor:
James R. Semple
By Hill & Hill attys

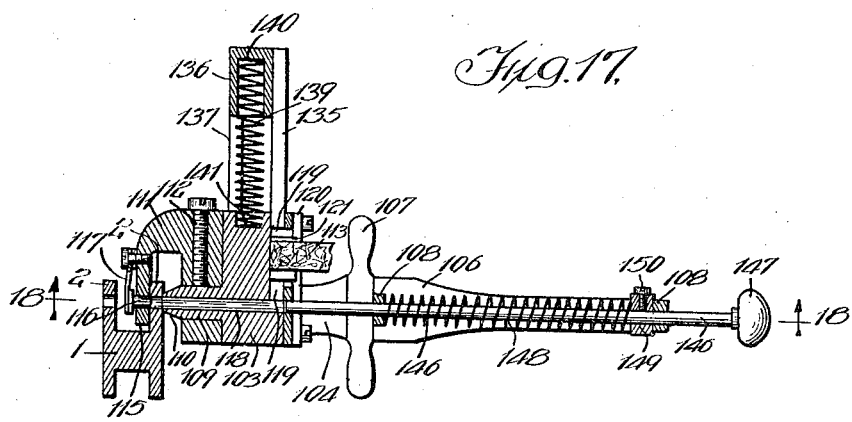

Patented Mar. 25, 1924.

1,488,172

UNITED STATES PATENT OFFICE.

JAMES R. SEMPLE, OF CHICAGO, ILLINOIS, ASSIGNOR TO PIANO AND ORGAN SUPPLY COMPANY, OF CHICAGO, ILLINOIS, A CORPORATION OF ILLINOIS.

MACHINE FOR FORMING AND INSERTING BUSHINGS IN PIANO ACTIONS.

Application filed January 26, 1920. Serial No. 354,199.

*To all whom it may concern:*

Be it known that I, JAMES R. SEMPLE, a citizen of the United States, residing at Chicago, in the county of Cook and State of Illinois, have invented certain new and useful Improvements in a Machine for Forming and Inserting Bushings in Piano Actions, of which the following is a description.

My invention belongs to that general class of devices for inserting bushings in various parts of piano actions, and relates particularly to a machine or tool which will form the bushings and insert the same in the action part. The invention has among its objects the production of a construction of the kind described that is simple, convenient, durable, compact, efficient, economical and satisfactory for use wherever found applicable. Many other objects and advantages of the construction herein shown and described will be obvious to those skilled in the art, from the disclosure herein given.

To this end my invention consists in the novel construction, arrangement and combination of parts herein shown and described and more particularly pointed out in the claims.

In the drawings, wherein like reference characters indicate like or corresponding parts, Fig. 1 is a plan view of a machine embodying the invention;

Fig. 2 is a sectional view taken substantially on line 2—2 of Figure 1;

Figs. 3, 4, 5 and 6 are side elevations of several cams employed in the mechanism for automatically operating the machine;

Fig. 11 is a sectional view taken substantially on line 11—11 of Fig. 7;

Fig. 12 is a similar view showing the parts in changed positions;

Fig. 17 is a sectional view taken substantially on line 17—17 of Fig. 18 of a manually operated machine or tool for inserting the bushing singly;

Fig. 18 is a sectional view taken substantially on line 18—18 of Fig. 17;

Fig. 19 is a sectional view taken substantially on line 19—19 of Fig. 18; and

Fig. 20 is a sectional view taken substantially on line 20—20 of Fig. 19.

Figure 8:
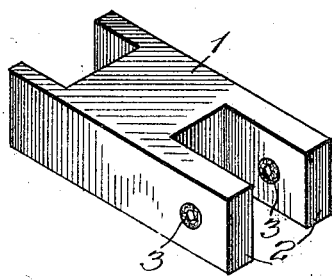
Fig. 8 is a perspective view of one part of a piano action.
Figure 9:
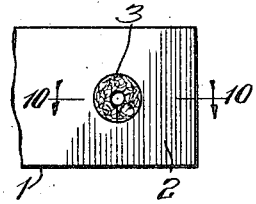
Fig. 9 is a side elevation of one of the flanges.
Figure 10:
Fig. 10 is a sectional view taken substantially on line 10—10 of Fig. 9.

In order that the invention may be more clearly understood, reference should be had to Figs. 8, 9 and 10, in which 1 represents any piano action part, for example, butt, lever or damper finger, flange or jack, wippen, tongue, tongue flange, etc., in which it is desired to insert one or more cloth or the like bushings. The particular action part 1 shown is known as a jack flange and is provided with the tongues 2—2, having holes or openings through the same, in which are to be inserted the bushings 3. The tongues shown are provided with openings 4, which in the preferred construction are screwthreaded, this, however, being immaterial in so far as the present invention is concerned, and is the subject matter of a separate application covering the part and bushing proper. The advantage of the threading, however, is that the bushing may be inserted and retained in place without glue or other securing means. The purpose of the present machine is to form the bushing 3 and without glue insert the same in the holes 4. An automatic machine as well as a simplified hand or manually operated tool construction embodying the salient features of the machine are shown and described.

Figure 13:
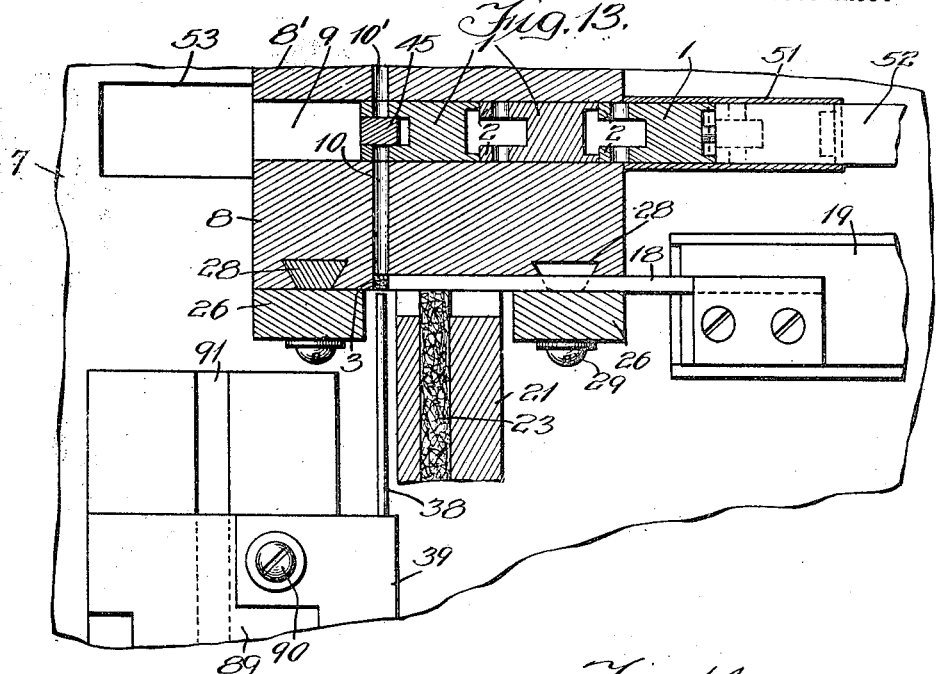
Fig. 13 is a sectional view taken substantially on line 13—13 of Fig. 12.

The machine is provided with a suitable frame or bed 7, upon which is mounted a pair of heads 8 and 8', the machine shown being adapted to insert one bushing or two bushings from opposite sides of the part. Inasmuch as the two mechanisms are similar, a description of one will suffice for both, similar parts in one being shown with the same identifying characters primed, it being understood that there may be a single mechanism or two or more, depending upon the number of bushings to be inserted in the parts. Heads 8 and 8' are spaced to provide a passage or guide-way 9 along which the action parts may be moved, suitable means being provided for automatically feeding them one at a time between the heads. As most clearly shown in Fig. 13, the heads are provided with bushing passage-ways or openings 10 and 10', in one end of which the bushing is formed in each head and then pushed outward and inserted or seated in the part 1. The part 8 (see Figs. 11 and 12) is formed with a groove or passage-way 12 which connects at 11 with the passage-way 10, preferably substantially tangentially from one side as shown. In Fig. 11, 13 represents an unformed bushing of cloth or equivalent material, which has been severed from a strip in the manner hereafter described, and is ready to be moved in the groove 12 into the passage-way 10 and formed therein, as is shown in Fig. 12. The head is provided with a part 16 which carries a cutting block 15, preferably of wood, which cooperates with the cutter 22 (see Fig. 7) when the same is operated to cut off the cloth from the strip. By employing a wood or similar block, dulling of the cutter is to a large extent avoided. Arranged adjacent the groove 12 and arranged to move thereinto and engage the unformed bushing 13, is a slide 17 which is arranged to engage and hold the end of the felt until it is severed from the strip and thence rise and release the same so as to provide clearance for the reciprocating or push bar 18, which is adapted to move along the groove 12 and push the piece 13 into the passage 10, thereby forming the bushing as indicated at 3 in Fig. 12, 3 and 13 representing the same piece of cloth, 13 before it is formed into the bushing and 3 after it is formed. The push bar 18 may be mounted on a reciprocating head 19, and operated in the manner hereinafter described or the equivalent.

Figure 7:
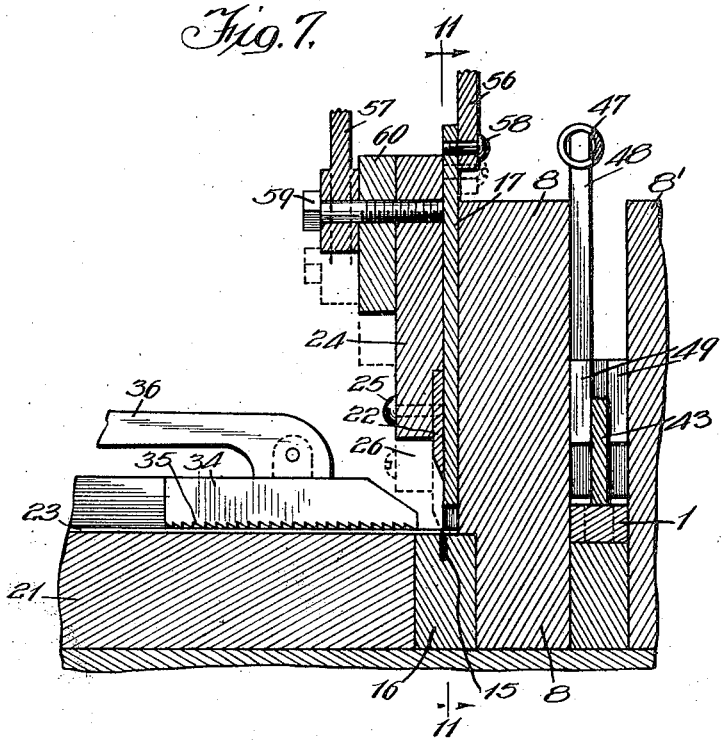
Fig. 7 is a sectional view taken substantially on line 7—7 of Fig. 1, the parts enlarged to more clearly show the construction.

As most clearly shown in Figs. 7 and 13, 23 represents a strip of cloth which is fed to the groove 12 as hereinafter described, and from which the unformed bushing 13 is severed, the same being carried by a part 21. The knife blade 22 is shown mounted on a head 24, the same being secured in place by screws 25 or the equivalent. The head 24 may be slidably mounted on the head 8. As shown, the same is provided with parts 28 adjacent its sides 26, which engage in grooves in the head 8. A portion of the part 24 is cut away at the center to clear the parts immediately below the side portions 26 projecting down at each side of the block 16 when the head 24 is depressed. In the particular construction shown, the parts 28 are secured on the head sides 26 by screws 29, it being understood that any equivalent construction may be employed. One of the parts 28 (see Fig. 11) is cut away as at 30, so as to permit the passage of push rod 18 therethrough.

The strip of cloth 23 or its equivalent may be fed into the groove 12 in any suitable manner. As shown, I provide a push or feeding member 34, which may be provided with teeth 35 arranged to engage with the cloth and push it under the knife, the part 34 being actuated by an arm 36, as will be hereinafter described.

Figure 14:
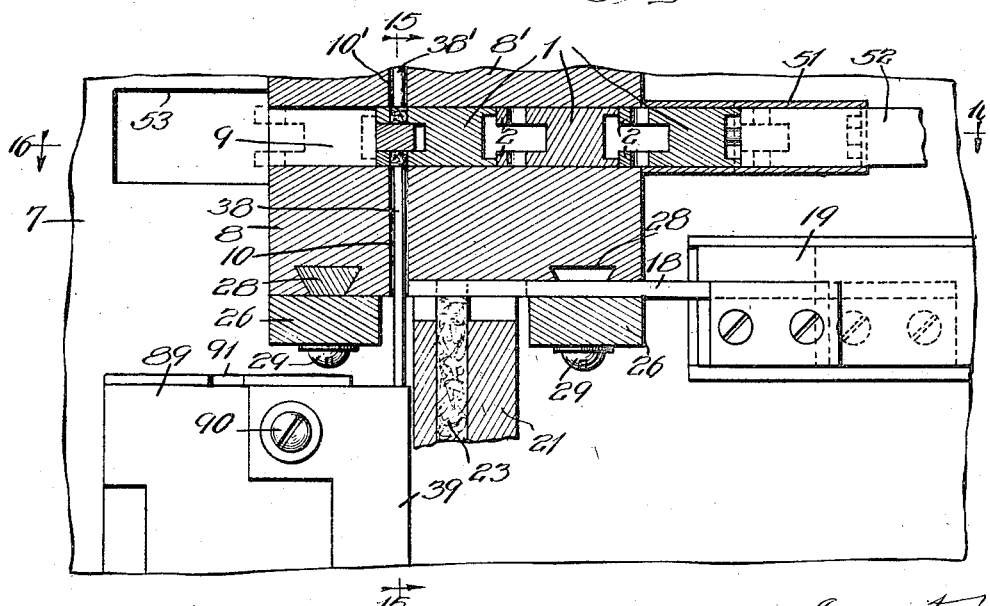
Fig. 14 is a similar view showing the parts in changed positions.
Figure 15:
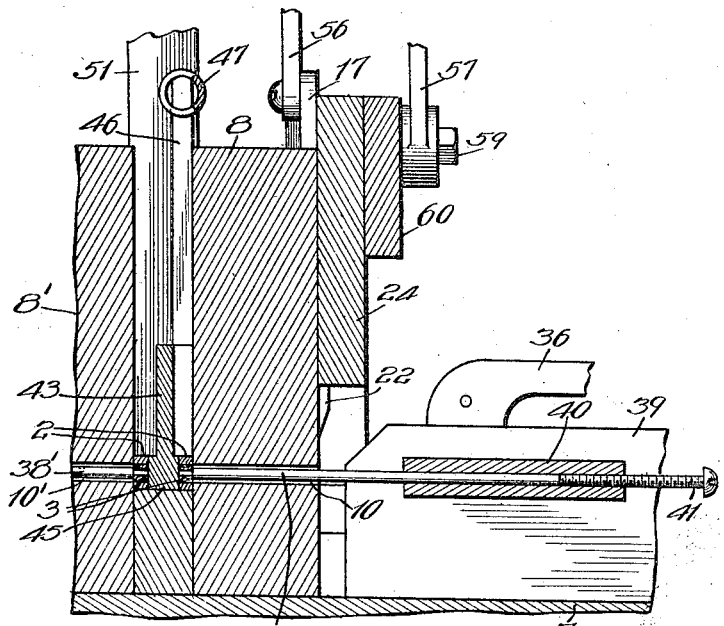
Fig. 15 is a sectional view taken substantially on line 15—15 of Fig. 14.

In order to push or feed the formed bushing from the groove 12 in the passage 10 to the part 1 or its equivalent in the guide-way 9, I provide a push rod 38 or its equivalent. This rod (see Figs. 13, 14 and 15) is adjustably mounted in a part 40 carried on a head 39, the rod being preferably threaded as at 41 so that it may be adjusted to give the desired travel. Arranged over the guide-way 9 is a member 43 which is preferably pivotally supported at 44, and is provided with a part 45 arranged to drop in, in the case of an action part similar to 1, between the tongues 2 and form a stop for the bushings, so that they will not be pushed in too far, but only flush with the inner faces of the tongues. The member is constructed to fit the particular part to be bushed. This member 43 is shown provided with an arm 46, to which may be attached a spring 47, which has one end anchored to the part 48 or an equivalent for the purpose. I have shown member 43 guided by a member arranged on the head and having the extending parts 49 arranged to engage at each side of the part 43. Arranged to discharge into the guide-way 9 is a hopper 51, into which parts 1 or the equivalent are fed in any suitable manner. The particular design and size of the hopper 51 will depend upon the particular action part to be fed to the machine. The parts are fed from the hopper one at a time by means of a push rod 52 or equivalent means for the purpose, which may be operated in any preferred manner. The same is preferably made adjustable so that it may be adjusted to the particular type of part to be bushed. The operating mechanism therefor which I have provided is described in detail hereinafter.

Referring to Figs. 1 and 2, as well as Fig. 7, I have shown actuating mechanism for the heads 17 and 24, as well as the other parts, it being understood that substantially only half of the machine is shown. Pivotally secured to part 17 at 58 is a link 56, and secured to part 60 on the head 24 by means of the screw 59 or the equivalent is a link 57. Links 56 and 57 are secured to rocker arms 61 and 62, which are pivotally supported at 63. Arms 61 and 62 are extended as at 64—65 respectively, and provided with rolls 77 arranged to cooperate with the cams 71 and 72 secured on a shaft 73. Shaft 73 may be driven in any suitable manner. As shown, it is driven through gearing 74 and 75 suitably shafting from a driving pulley 76. Also mounted on shaft 73 is a cam member 78 which is arranged to cooperate with a cam roller 79 carried by an arm 80, which is connected with the cross head 81, connecting the heads 19 and 19′ for the two pusher rods 18 and 18′. The same is also connected with and actuates the push rod 52 for feeding the parts 1 from under the hopper. A spring 82 may be provided for normally maintaining the roll 79 in contact with the cam 78, or that is, cooperate with the cam to reciprocate the rod 80. Any equivalent construction may be employed.

There is also arranged on the shaft 73 a cam 83 having a series of cam faces 84 arranged to cooperate with the roll 85 on lever 86, which is preferably pivotally supported at 87. The lever 86 is connected by a link 88 with a head 89, which carries the push rod head 39, the same being secured thereto by means of screws 90 or the equivalent. As shown, the table or frame 7 may be slotted as at 91, so as to receive a projecting part on the head 89 and guide the head in its travel.

There is also provided a cam 93 on shaft 73 which cooperates with the cam roller 94 on an arm 95, which is pivotally supported at 96 and has an extending arm 97 connected with a part 98 which is connected with rod 36, in the construction shown, parts 98 and 36 being substantially the same part. The part has a projecting part 100 arranged to fit into a groove 101 in part 21 which carries the strip of cloth. A spring 99 or equivalent means may be provided as shown to retrieve the parts.

In the hand tool shown in Figs. 17 to 20, the construction is essentially similar to the automatic machine described, except that the parts are smaller for convenience in handling and are manually operated, and the same is for a single bushing. This device while not as rapid as the automatic machine, nevertheless is very satisfactory and a great improvement over existing mechanisms for the purpose or the usual hand or manual insertion of the bushings in a strip through numerous parts and thence severing the strip between the various action parts and trimming the strip flush with the sides of the parts. Referring to these figures, 103 represents a head, which is preferably formed with an extending part 104 formed integral therewith or separate as shown and secured by a screw 105 or the equivalent. The parts are arranged to interengage so that the part 104 will not pivot about the screw. The part 104 is extended as at 106 and preferably provided with lugs 108 and a cross bar 107. Arranged on the head is a part 109 which is preferably tapered at the end as at 110. Secured to part 109, as shown, is a part 111, 112 being a screw or the equivalent for locking the part in place. Part 111 has an extending part 115 which carries a pin 116 which is yieldingly maintained in place by a spring 117 or the equivalent. Head 103 is provided with an opening 118 which extends through the same and through the part 109, and corresponds to opening 10 in the mechanism previously described, and is also provided with a groove 119. Arranged adjacent the groove 119 is a block 121 preferably of wood, which may be secured in place by a plate 120. The head also carries a knife blade or cutter 122 which is mounted on a shank 123, which in the construction shown is extended at 124 and provided with a cross bar 125. The blade and shank are slidably mounted on a plate 126 and maintained in place by a plate 127, the plates 120 and 127 being secured in place by screws 128 or equivalent means for the purpose. Plate 126 is provided with a pin 129 and shank 123—124 with a pin 130 projecting through a slot in the plate, the two pins being connected by a spring 131, the spring tending to raise the knife and maintain it in its raised position. In the construction shown there is provided a part 134 hereinafter referred to on the plate 126 which is secured by a screw 133, 132 being an additional screw or the equivalent for securing the plates 127 and 126 together.

Arranged to move into the groove 119 is a push rod 135, which is carried by a head 136, and which push rod also serves as one of the guides for the head. Additional guides 137 and 138, however, are provided which extend into slots 142 and 143 in the head. A spring 139 is provided which normally maintains the head in the position shown in Fig. 17, so that the push rod is in its out position. As shown, the head 136 is recessed at 140 and the head 103 is recessed at 141, the spring engaging in the recesses and being maintained in place. The outward movement of the head, however, is limited by a pin 144 arranged on the guide-bar 137, which engages with the part 134 previously described or by equivalent mechanism (see Figs. 18 and 20). Carried by the lugs 108 and movable into the passage 118, is a push rod 146 which is provided with an enlarged end 147. The push rod is normally maintained out by a spring 148 or the equivalent, 149 being a collar on the rod which is secured in place by a set screw 150 or the equivalent. Collar 149 serves to limit the outward movement of the push rod and forms a bearing for one end of the spring 148.

Figure 16:
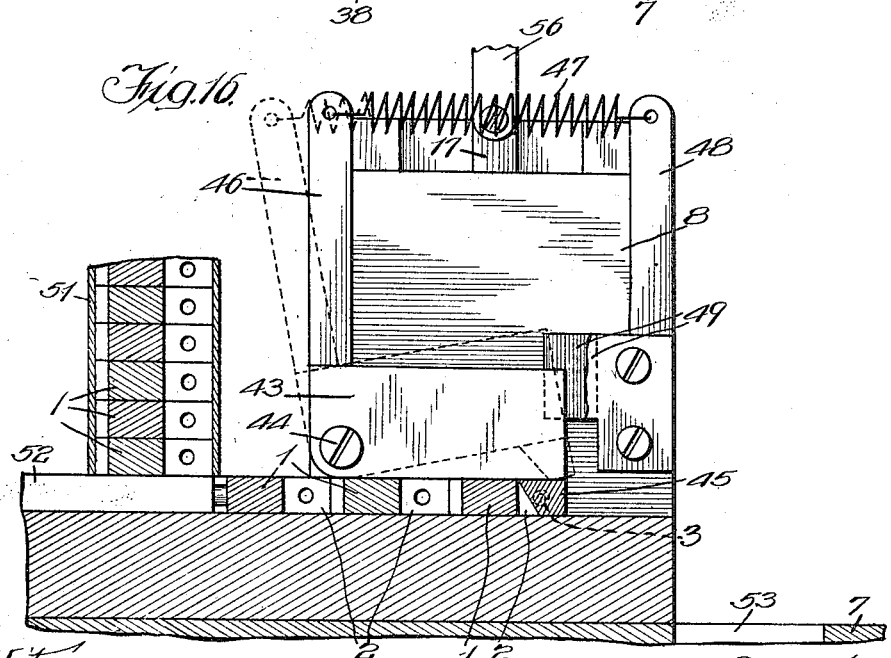
Fig. 16 is a sectional view taken substantially on line 16—16 of Fig. 14.

The operation of the machine may be briefly described as follows. Assuming that the hopper 51 is filled with parts to be bushed, some of the same having already entered the guideway 9 and being in the positions shown in Figs. 14 and 16. As shaft 73 is driven, there being a piece of tape under the cutter 22, as shown in Fig. 7, cam 72 causes, through the connecting mechanism, holding member 17 to descend and hold the end of the tape or unformed bushing 13, as shown in Fig. 11. Cam 71, through the connecting mechanism, causes the knife 22 to descend as indicated in the dotted lines in Fig. 7, severing 13 from the strip 23. As the holding member 17 and knife ascend, cam 78, through the connecting mechanism, moves the push rods 18 and 18' (and feeding push rod 52), so that the unformed bushings 13 are pushed into the openings or passageways 10 and 10', and formed into the bushings 3 as shown in Fig. 12. The part to be bushed (see Fig. 13) is pushed sufficiently to bring the openings 4 in the part 1 in alignment with the passageways 10 and 10', the part 45 lying between the two tongues 2 and preventing the part from over-traveling in passing the openings. In the meantime, as shaft 73 continues to rotate, cam member 83 through the connecting mechanism, causes the push rods 38 to engage the bushing and push the same into the holes 4 in the tongues 2 of the part 1. It will be particularly noted that owing to the shape or construction of the cam 83, the push rods 38 do not push with a continuous push, but in a series of varying pushes, so that the same pushes in slightly, withdraws a little, and thence pushes the bushing a little further, etc. This step by step action tends to prevent any wedging of the bushings in the openings or accidental catching of the same at the juncture of the opening and the groove 12. In the meantime, the holder 17 and knife being in raised position, cam 93, through the connecting mechanism, has actuated part 34 so as to push the end of the strip 23 in place to be engaged by the holding bar 17 and severed by the knife. The operations are repeated as described.

In the hand operated tool, the cloth strip 113 is pushed in under the knife as indicated in Fig. 17, and the knife depressed by engaging the end 125. The part 1 is inserted as shown in Fig. 17, the same being maintained in place by the yielding pin 116. This also centers the opening in the part with the passage 118. Head 136 is then moved toward the body or part 103, forcing the severed pieces of cloth into the opening 118 to form the bushing similar to the automatic machine described, the opening 118 and connecting groove 119 being constructed in the same manner as that described. The push rod 146 is then pushed in, it being possible to hold the tool in one hand with the palm of the hand engaging 147 and two fingers engaging the cross bar 107. The formed bushing is in this manner forced through the passage 118 into the hole in the action part. The bushing in the opposite tongue 2 is similarly inserted.

It has been found by experience that with the use of the machine or tool herein described, not only is there a very considerable saving in time, but that there is a considerable saving in material, that is to say in cloth, which is comparatively expensive. The automatic machine is of course many times faster than with the hand tool, but the hand tool handles the insertion of bushings much quicker and easier, as well as more efficiently, than any hand operation or mechanism heretofore used, in so far as I am aware. By employing my improved flange or part construction, in which the openings in the part are threaded, it is unnecessary to use glue or the like, this machine or tool described seating, or setting, or inserting the bushing and producing substantially a perfect construction. In the particular machine illustrated, I have shown the same as heretofore constructed and used, but it is possible to considerably simplify the construction and reduce the number of separate parts without varying the operation any.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a head member having an opening therein and provided with a channel connecting with and tangential to the axis of said opening at one side thereof, means for severing a portion of a strip of material inserted in said channel, means for thereafter engaging said portion and moving the same transversely of said channel into said opening, and means for thereafter moving the same in said opening.

2. In a device of the kind described and in combination, a head member having an opening therein and provided with a channel connecting with and tangential to the axis of said opening at one side thereof, means for engaging a strip of material inserted in said channel, means for severing a portion therefrom, means for thereafter engaging said portion and moving the same transversely of said channel into said opening, and means for thereafter moving the same in said opening.

3. In a device of the kind described and in combination, a head member having an opening therein and provided with a channel connecting with and tangential to the axis of said opening at one side thereof, means for engaging a strip of material in said channel and fixedly holding it in place, means for severing a portion therefrom while so held, means for thereafter releasing said severed portion and moving the same transversely of said channel into the said opening, and means for thereafter moving the same in said opening.

4. In a device of the kind described and in combination, a head member having an opening therethrough and provided with a channel connecting with said opening at one side thereof, means for engaging a strip of material inserted in said channel, moving the same into said opening, and automatic means for thereafter moving the same in said opening in a step by step movement.

5. In a machine of the kind described and in combination, a head member having an opening therein and provided with a channel connecting with said opening at one side thereof, means for engaging an end of a strip of bushing material inserted in said channel and holding the same in place, means for severing a bushing blank from the end of said strip, means for thereafter engaging said blank and pushing the same into said opening and rolling the same in the interior thereof, and means for thereafter moving the blank in the opening.

6. In a machine of the kind described and in combination, a head member having an opening therein and provided with a channel connecting with said opening at one side thereof, means for engaging an end of a strip of bushing material inserted in said channel and holding the same in place, actuating means for said engaging means, means for severing a bushing blank from the end of said strip, actuating means for said severing means, means for thereafter engaging said blank and pushing the same into said opening and rolling the same in the interior thereof, actuating means for said engaging and pushing means, means for thereafter moving the blank in the opening, and actuating means for said last mentioned means.

7. In a machine of the kind described and in combination, a head member having an opening therein and provided with a channel connecting with said opening at one side thereof, means for engaging an end of a strip of bushing material inserted in said channel and holding the same in place, actuating means for said engaging means, means for severing a bushing blank from the end of said strip, actuating means for said severing means, means for thereafter engaging said blank and pushing the same into said opening and rolling the same in the interior thereof, actuating means for said engaging and pushing means, and means for thereafter moving the blank in the opening, actuating means for said last mentioned means, and means for successively controlling said several actuating means in a predetermined manner.

8. In a machine of the kind described and in combination, a head member having an opening therethrough and provided with a channel connecting with said opening at one side thereof, means for feeding a strip of bushing material to said channel, means for engaging the end of said strip of bushing material inserted in said channel and holding the same in place, means for severing a bushing blank from the end of said strip, means for thereafter engaging said blank and pushing the same into said opening on the interior thereof, and means for thereafter moving the blank in the opening.

9. In a bushing machine of the kind described, a plurality of spaced heads, each having an opening therethrough, and provided with a channel connecting with said opening at each side thereof, mechanism at each head for firmly engaging an end of a strip of bushing material inserted in the channel and holding it in place, mechanism for severing a bushing blank from each of said strips at their engaged ends, mechanism for thereafter moving said blanks into the openings in said heads, mechanism for thereafter moving the blanks toward each other in said openings, and means for successively actuating said mechanism in a predetermined manner.

10. In a bushing machine of the kind described and in combination, a head provided with a cylindrical opening therethrough and having a channel extending tangentially to said opening and connected therewith at one side thereof, means in said head for pushing a bushing inserted in said channel into said opening and rolling the same therein, and automatic means for pushing the rolled blank through the opening, in a step by step movement, and means for centering an action part adapted to receive said bushing at the discharge end of said opening.

11. In a bushing machine of the kind described and in combination, a head having an opening therethrough and provided with a channel connecting with said opening, means arranged in said channel for forming said blank in said opening, means for engaging the end of the formed blank and pushing the same out of said opening, and means for centering the part to be bushed at the discharge end of said opening and limiting the movement of the bushing within said part, said last mentioned means engageable in the end of the bore being bushed.

12. In a bushing machine of the kind described and in combination, a head having a pair of opposed, aligned openings therethrough, each provided with a channel connecting therewith, means arranged in each of said channels for forming said blanks in said openings, means for engaging the ends of the formed blanks and pushing the same out of said openings, and means insertable between the parts to be bushed at the discharge ends of said openings for centering said parts and limiting the movement of the bushings therein.

In testimony whereof, I have hereunto signed my name in the presence of two subscribing witnesses.

JAMES R. SEMPLE.

Witnesses:
  Roy W. Hill,
  Bertha Hartmann.